Patented June 9, 1931

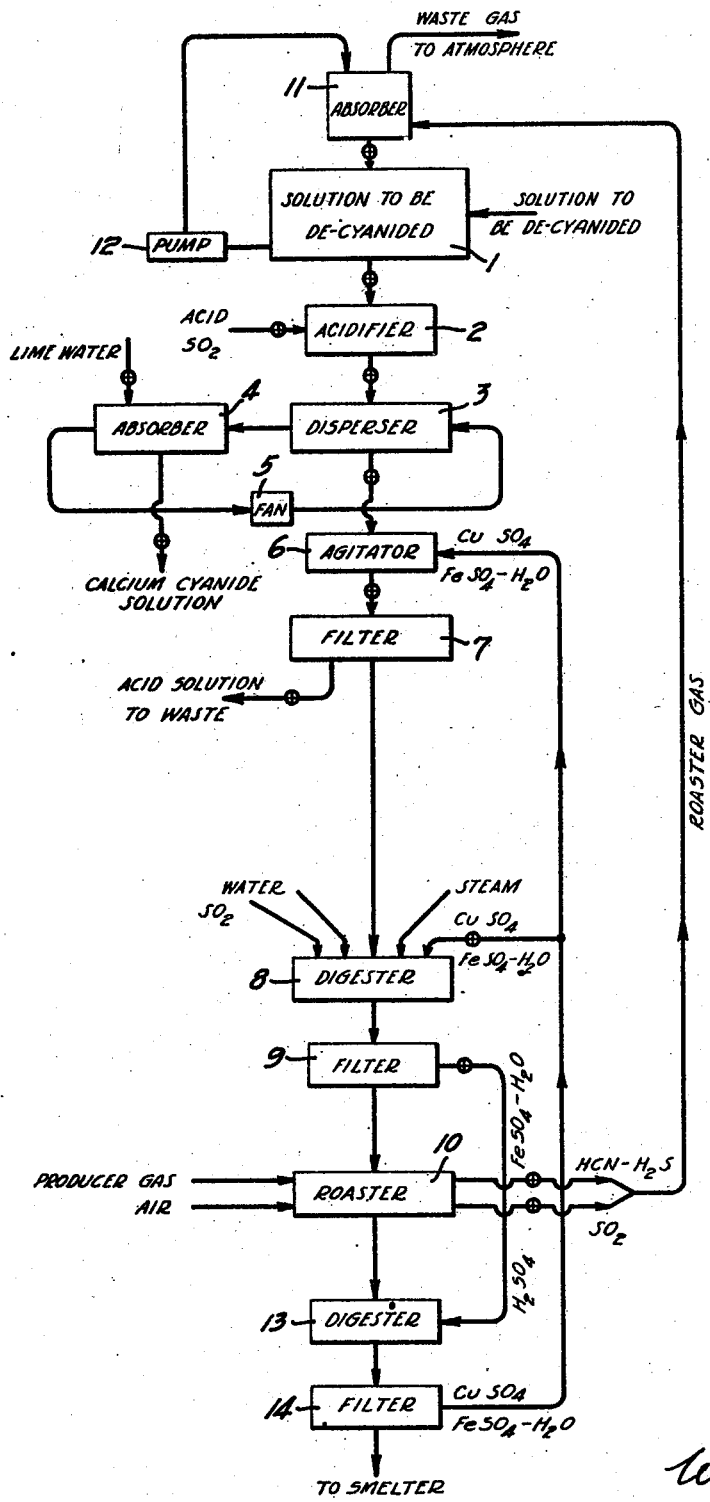

1,809,248

UNITED STATES PATENT OFFICE

LOUIS D. MILLS AND THOMAS B. CROWE, OF PALO ALTO, CALIFORNIA, ASSIGNORS TO THE MERRILL COMPANY, OF SAN FRANCISCO, CALIFORNIA, A CORPORATION OF CALIFORNIA

CYANIDE RECOVERY PROCESS

Application filed August 14, 1928. Serial No. 299,554.

This invention relates generally to processes for the recovery of cyanogen from cyanide solutions used in treatment of ores containing gold, silver and copper.

In treating such ores according to the cyanide process, a certain amount of the cyanogen of the treating solution is rendered unfit for further use in dissolving metals. This cyanogen constitutes what is termed the "cyanide consumption" of the treatment process and is caused from the fact that copper, sulphur and iron enter into the solution forming with the cyanogen, compounds such as sodium copper sulphocyanide, sodium copper ferrocyanide, and sodium copper cyanide. When precipitation with zinc is employed, the copper contained in these compounds is only partly precipitated, and frequently the remainder of the copper, together with the cyanogen compounds with which it is associated, and in addition unprecipitated gold and silver are wasted with the mill tailings. Processes have previously been proposed for the recovery of an available form of cyanogen from such mill tailings, and it is a general object of this invention to improve upon such processes.

It is a further object of this invention to devise a process of the character described above which will be efficient in operation and will make possible more complete recovery of cyanogen, and of metals such as gold, silver and copper.

It is a further object of this invention to devise a cyanide recovery process in which certain compounds containing cyanogen are precipitated from the solution by the use of a suitable chemical after the solution has been acidified.

It is a further object of this invention to devise a novel method of effecting purification of hydrogen cyanide gas recovered by the roasting of cyanogen compounds in a reducing atmosphere.

It is a further object of this invention to effect more complete recovery of cyanogen from compounds precipitated from cyanide solutions, by treating the precipitate with a suitable chemical before the roasting operation.

Further objects of the invention will appear from the following description in which we have set forth the preferred embodiment of our invention. It is to be understood that the appended claims are to be accorded a range of equivalents consistent with the state of the prior art.

Referring to the drawing:

The single view is a flow sheet representing diagrammatically the steps of our process according to the preferred embodiment of the invention.

Our process can be briefly outlined as follows: The protected cyanide solution to be treated is acidified to effect precipitation of certain metallic compounds and to cause formation of hydrogen cyanide. Hydrogen cyanide is then dispersed from the solution, and is absorbed in a suitable alkali. The dispersed solution is treated with a suitable chemical, preferably copper sulphate, to effect further precipitation of metallic compounds. The precipitate is removed from the solution and is digested with suitable chemicals, such as acid and copper sulphate, to make possible more complete recovery of cyanogen in a subsequent roasting operation. Impure hydrogen cyanide gas produced by roasting the precipitate in a reducing atmosphere is directly introduced without purification into the beginning of the recovery cycle.

The details of our process can be understood by reference to the accompanying drawing. At the beginning of the cycle it is presumed that the solution to be decyanided, which is protected with a suitable alkali, is in the storage tank 1. From this tank the solution passes thru an acidifier 2, where the solution is rendered acid by a suitable chemical, preferably a sulphur-oxygen acid. Good results have been obtained by the use of sulphur dioxide gas, and preferably the acidifier 2 causes the sulphur dioxide to be intimately contacted with the cyanide solution. According to well known reactions, acidification of such cyanide solutions causes release of hydrogen cyanide and precipitation of certain compounds of metals.

After acidification, the solution and any precipitate which may have formed are introduced into a disperser 3, where the hydrogen cyanide is removed by contacting the solution with large volumes of a suitable fluid such as air. In practice we prefer to connect disperser 3 in series with an absorber 4 and to circulate large volumes of air through the same by means of fan 5. Air is passed thru disperser 3, is brought in counterflow contact with the cyanide solution, and is then passed thru absorber 4 where the air and hydrogen cyanide are brought in counterflow contact with a suitable alkaline solution, such as calcium hydroxide or lime water. From absorber 4 the air is reintroduced into fan 5. The hydrogen cyanide reacts with the lime water to form calcium cyanide, in which form the cyanogen is available for reuse in treating ores. The solution and precipitate remaining in disperser 3 is then introduced in a reservoir 6 provided with suitable agitating means. In reservoir 6 we add to the solution a chemical capable of effecting further precipitation of compounds of gold, silver and copper.

Our process is particularly adapted for use with cyanide solutions employed in the treatment of ores containing a fairly high percentage of copper, sulphur and iron. Upon acidification of solutions employed in the treatment of such ores, certain soluble cyanogen containing compounds of metals are present which are not precipitated. If such compounds are permitted to remain in solution, they form a source of waste cyanogen and metals and therefore reduce the efficiency of the recovery process. The introduction of a suitable chemical into the agitator 6 is for the purpose of breaking down such soluble compounds of metals and to precipitate compounds from which cyanogen and metals can be subsequently removed. To effect this further precipitation, we prefer to employ copper sulphate, although a variety of salts of metals may be employed. In addition to copper sulphate good results can be obtained by employing chlorides of copper, or salts of metals such as silver and mercury which are soluble in the acid solution. In any event the salt or other chemical employed should be effective to combine with sulphocyanides and ferro cyanides to form insoluble compounds of metals which precipitate from the solution. The copper sulphate introduced at this point may be mixed with a certain amount of iron salts, as for example ferrous sulphate, in which event both salts enter into the reaction. Copper salts serve to precipitate both sulpho and ferro cyanides while an iron salt is useful in that it aids in the precipitation of ferro cyanides, when such compounds are present. A mixture of copper sulphate and ferrous sulphate is obtained in another step of our process as will be presently explained. In practice a slight excess of copper salt is employed to render the precipitation complete. The salt can be added before the solution enters the disperser or within the disperser, but we prefer that it be added in a separate agitating vessel subsequent to dispersion.

From the agitator 6, the mixture is introduced into a filter 7, where the solution is separated from the precipitate and is discharged to waste, and the precipitate removed in the filter is then introduced into the digester 8. The precipitate now contains substantially all of the cyanogen present in the original cyanide solution, with the exception of that removed in the disperser, and the copper present is principally in the form of copper sulphocyanide or copper ferrocyanide or both. In addition the precipitate contains practically all of the metals such as gold or silver, or both, which were originally present in the cyanide solution being treated.

The digester 8 is for the purpose of chemically treating the precipitate in order to effect certain changes making possible more complete recovering of cyanogen in the subsequent roasting operation. This step is not essential to the process and may be omitted in case the additional recovery effected is not a material factor in efficiency of the process, but it is to be preferred in case the cyanide solution is of such a character that the precipitate recovered from the filter 7 contains a substantial percentage of compounds such as copper ferrocyanide, from which a complete recovery cannot be effected by roasting in a reducing atmosphere. The treatment of the precipitate in digester 8 serves principally the function of converting copper ferrocyanide and iron ferrocyanide to copper cyanide, in addition to which iron sulphate and sulphuric acid are formed. As a suitable chemical to effect this action, we prefer to employ a salt of a metal, such as copper sulphate, and this material is introduced into the digester 8 and agitated together with the precipitate at an elevated temperature. Heating of the contents of the digester can be conveniently accomplished by supplying steam as indicated. Although the reaction of copper sulphate with metal ferrocyanides results in the formation of sulphuric acid, we prefer to further acidify the mixture by the addition of a suitable acid, preferably a sulphur-oxygen acid. For this purpose water is supplied to the contents of digester 8 and the mixture is contacted with sulphur dioxide as indicated. In practice the copper sulphate can also be mixed with other salts such as ferrous sulphate.

The resulting mixture obtained in the digester 8 is passed thru the filter 9, and the separated precipitate is introduced into a roaster 10. In the roaster a batch of precipitate is first subjected at an elevated temperature to a reducing gas containing hydrogen, as for example producer gas. We have secured good results in practice by employing roasting temperatures from 600 to 900° Fahrenheit. As a result of this treatment cyanogen containing compounds are broken down to form hydrogen cyanide gas, which however is in an impure state as it is mixed with other gases, principally hydrogen sulphide. One of the important features of our invention is that this impure hydrogen cyanide gas need not be purified by special apparatus, but is introduced into the beginning of the removal cycle before the step of acidification. In this instance the impure hydrogen cyanide gas is introduced into an absorber 11 thru which solution from tank 1 is circulated by means of pump 12. Both the hydrogen cyanide and the hydrogen sulphide are absorbed by the alkaline cyanide solution and the additional hydrogen cyanide so introduced is ultimately recovered in available form from the absorber 4. Contrary to what might ordinarily be expected, we have discovered that the introduction of hydrogen sulphide at the beginning of the cycle does not materially increase the amount of precipitate recovered from the disperser 3, and apparently it forms soluble compounds which pass off together with the waste solution from filter 7.

After comparatively complete reduction of the contents of roaster 10 the introduction of a reducing gas is discontinued and an oxidizing gas, such as air, is introduced. The metal sulphides formed during the reducing operation are then converted to oxides, and sulphur dioxide is evolved. In practice we prefer to utilize this sulphur dioxide by employing it for aiding acidification of the cyanide solution precipitated in disperser 3. Therefore we have indicated introduction of this sulphur dioxide gas from the roaster 10 in to absorber 11. While introduction of sulphur dioxide into the absorber 11 aids in effecting acidification, it is not of itself sufficient to render the solution acid, and therefore hydrogen cyanide and insoluble metal compounds are not formed in the solution until it is further acidified in apparatus 2.

The calcine recovered from roaster 10 contains oxides of the metals in the precipitate, chiefly copper together with gold and silver. This calcine is preferably introduced into a digester 13, for the purpose of producing suitable metal salts for use in agitator 6 and digester 8. For example in digester 13 we introduce the acid solution recovered from the filter 9, which is a solution of iron sulphate and sulphuric acid. Copper and/or iron oxides in the calcine are thereby converted to sulphates of these metals, and the solution of these soluble salts is separated from the oxides of the remaining metals by means of filter 14 and is then utilized for introduction into agitator 6 and digester 8 as indicated. The undigested metals recovered from filter 14, consisting principally of oxides of copper, together with gold and silver, are removed from filter 14 and smelted to obtain the desired metals.

It will be noted that the above process not only effects more complete recovery of cyanogen from cyanide solutions, but the entire recovery process is carried out by the use of a minimum amount of additional chemical. The process also makes possible a relatively simple apparatus, particularly since we dispense with the use of additional means for purifying the hydrogen cyanide gas recovered from the roaster 10.

In order to further clarify our invention, the following example is given of our process as applied to cyanide solution employed in the treatment of a certain ore. It is to be understood that this example is for the purpose of description only and is not to limit the invention defined by the appended claims.

A base ore containing approximately forty per cent sulphur as sulphides of iron, copper, zinc and lead, was crushed and ground in water and concentrated by the flotation process. The tailings, after concentration, contained .055 oz. gold, .87 oz. silver, .16 per cent copper, 1.16 per cent zinc and .12 per cent lead. 4000 grams of these tailings were treated with protected alkaline cyanide solution containing 11.25 grams of sodium cyanide. The resulting solution contained 4.74 grams of free sodium cyanide. The remainder of the cyanogen originally present, equivalent to 6.51 grams of sodium cyanide, was present in the solution mostly as metal sulphocyanides and metal ferrocyanides with smaller amounts of metal cyanides.

Upon acidifying the solution with sulphur dioxide and adding 4 grams of copper in the form of copper sulphate, and upon recovering the liberated hydrogen cyanide, the recovery from the absorber 4 was found equivalent to 7.88 grams of sodium cyanide. The precipitates of copper ferrocyanide and copper sulphocyanide were formed into a pulp with water and digested with steam, sulphur dioxide and copper sulphate, and after filtration, the resulting copper sulphocyanide and copper cyanide was heated in contact with illuminating gas. The evolved hydrogen cyanide and hydrogen sulphide was absorbed in a solution of caustic soda which was subsequently acidified with sulphur dioxide and treated to remove the pure hydrogen cyanide which, after absorption in fresh caustic soda solution, was found to be equivalent to 1.49 grams of sodium cyanide. Thus the total recovery or regeneration by the use of the process was 7.88 grams + 1.49 grams = 9.37 grams from an original 11.25 grams leaving a consumption of 1.88 grams, or .94 pounds sodium cyanide per ton of tailings treated.

The tailings after cyanide treatment contained .015 oz. gold and .32 oz. silver, showing that 72.7 per cent of the gold and 63.2 per cent of the silver had been dissolved by the cyanide solution. The acid filtrate from the filter 7 contained only traces of gold and silver showing that substantially all of the gold and silver dissolved from the tailings was contained in the residue from the filter 14.

It will be noted in the above example that precipitation of metals from the solution was effected within our recovery process without preliminary precipitation with zinc dust. This method of operation is desirable where the ore is of low grade. Our process is also applicable to the recovery of cyanide from protected solutions from which metals have been partially precipitated, as by treatment with zinc.

We claim:

1. In a process for the recovery of cyanide from cyanide solution employed in the treatment of ore, the steps of roasting metallic cyanide compounds precipitated from a cyanide solution, introducing hydrogen cyanide recovered from said roasting operation into another cyanide solution, and recovering purified hydrogen cyanide from said last mentioned solution.

2. In a process for the recovery of cyanide from cyanide solution employed in the treatment of ore, the steps of roasting metallic cyanide compounds precipitated from a cyanide solution, introducing unpurified hydrogen cyanide recovered from said roasting operation into another cyanide solution, and recovering purified hydrogen cyanide from said last mentioned solution.

3. In a process for the recovery of cyanide from cyanide solution employed in the treatment of ore, the step of roasting metallic cyanide compounds precipitated from a cyanide solution, introducing unpurified hydrogen cyanide recovered from said roasting operation into a cyanide solution from which substantially no cyanide has been removed, and recovering hydrogen cyanide from said last mentioned solution.

4. In a process for the recovering of cyanide from cyanide solution employed in the treatment of ore, the step of roasting metallic cyanide compounds precipitated from a cyanide solution, introducing unpurified hydrocyanic acid recovered from said roasting operation into an unacidified cyanide solution, and recovering hydrogen cyanide from said last mentioned solution.

5. In a process for the recovery of cyanide from cyanide solution employed in the treatment of ore, the step of roasting metallic cyanide compounds precipitated from a cyanide solution, said roasting being effected in the presence of a reducing gas, introducing unpurified hydrogen cyanide gas recovered from said roasting operation into an unacidified cyanide solution, acidifying said last named solution, and removing hydrogen cyanide from said last mentioned solution.

6. In a process for the recovery of cyanide from cyanide solution employed in the treatment of ore, the steps of roasting metallic cyanide compounds precipitated from a cyanide solution, introducing unpurified hydrogen cyanide in the form in which it is recovered from said roasting operation into an unacidified cyanide solution, effecting precipitation of metallic compounds from said last mentioned solutions by acidification and by the addition of a salt of a heavy metal, and removing purified hydrogen cyanide from said last mentioned solution.

7. In a process for the recovery of cyanide from cyanide solution employed in the treatment of ore, the steps of roasting metallic cyanide compounds precipitated from a cyanide solution, introducing unpurified hydrogen cyanide recovered from said roasting operation into an unacidified cyanide solution, effecting precipitation of metallic compounds from said last named solution by acidification and by the addition of a copper salt, and dispersing purified hydrogen cyanide gas from said solution by contact of the solution with a carrier gas.

8. In a cyclic process for the recovery of cyanide from cyanide solution employed in the treatment of ore, the steps of roasting metallic cyanide compounds precipitated from a cyanide solution, introducing unpurified hydrogen cyanide recovered from said roasting operation into another cyanide solution, precipitating metallic compounds from said last mentioned solution and removing purified hydrogen cyanide, and utilizing said precipitated compounds for step one of the cycle.

9. In a cyclic process for the recovery of cyanide from cyanide solution employed in the treatment of ore, the steps of roasting metallic cyanide compounds precipitated from a cyanide solution, introducing unpurified hydrogen cyanide recovered from said roasting operations into another cyanide solution, effecting precipitation of said other solution by acid and by addition of a salt of a heavy metal, removing freed hydrogen cyanide from said other solution, and utilizing compounds precipitated from said other solution for step one of the process.

10. In a cyclic process of the character described, the steps of precipitating metallic compounds from a cyanide solution by acidifying with an oxide of sulphur, roasting the precipitate to recover hydrogen cyanide, oxidizing the residue to form an oxide of sulphur, utilizing said oxide of sulphur to aid said first step of the process, and introducing the hydrogen cyanide recovered from the roasting operation into the cyanide solution before the solution is rendered acid.

In testimony whereof, we have hereunto set our hands.

LOUIS D. MILLS.
THOMAS B. CROWE.